(No Model.) 3 Sheets—Sheet 2.
A. TSCHUOR.
COMBINED CHURN AND ICE CREAM FREEZER.
No. 366,985. Patented July 19, 1887.

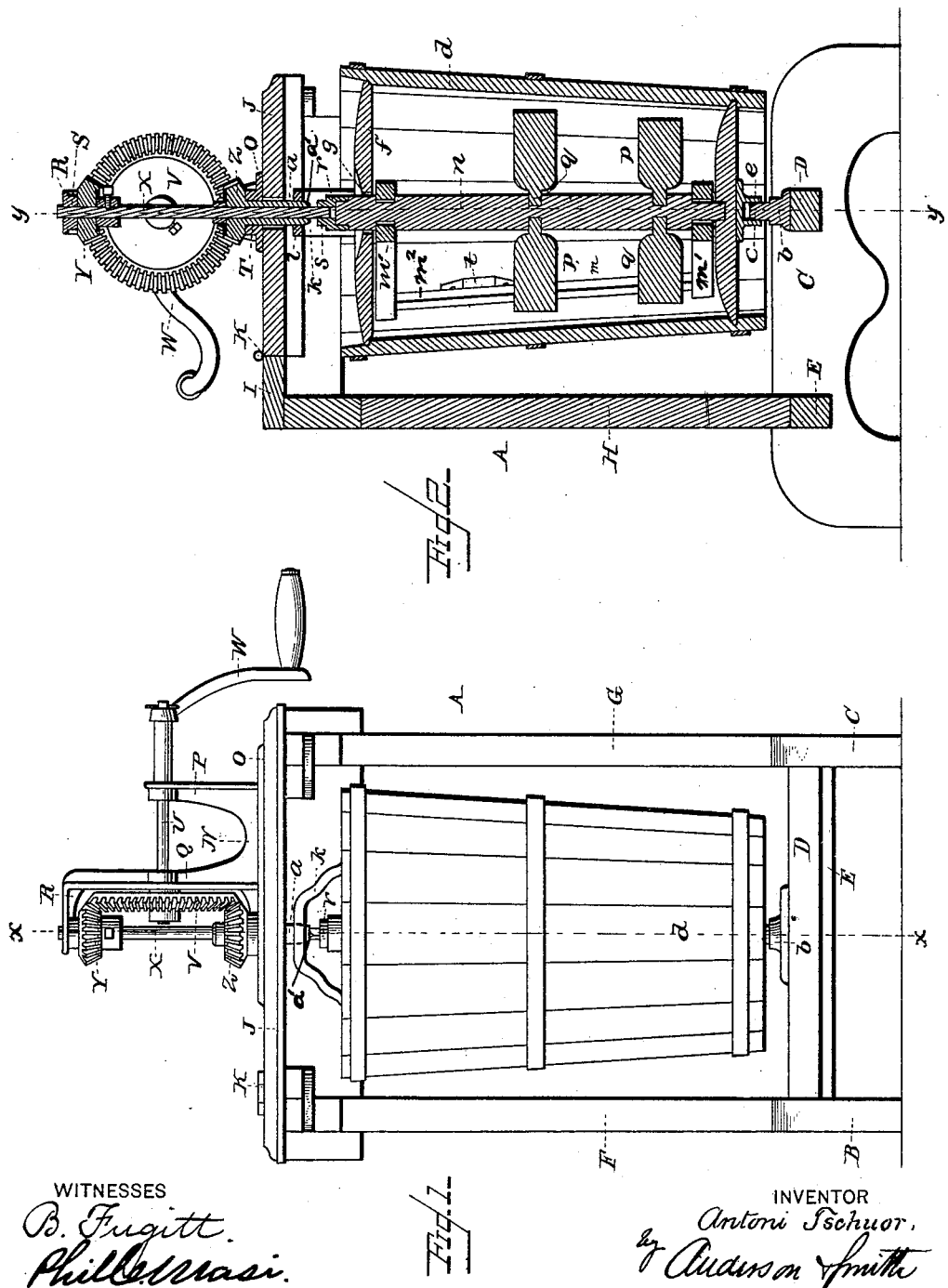

WITNESSES
B. Frigitt.
Phil C. Masi.

INVENTOR
Antoni Tschuor,
by Anderson & Smith
Attorneys (No Model.) 3 Sheets—Sheet 3.

A. TSCHUOR.
COMBINED CHURN AND ICE CREAM FREEZER.

No. 366,985. Patented July 19, 1887.

WITNESSES
B. Fugitt.
P.C.Masi.

INVENTOR
Antoni Tschuor.
by Audram & Smith
his Attorneys

UNITED STATES PATENT OFFICE.

ANTONI TSCHUOR, OF WAPAKONETA, OHIO.

COMBINED CHURN AND ICE-CREAM FREEZER.

SPECIFICATION forming part of Letters Patent No. 366,985, dated July 19, 1887.

Application filed February 5, 1887. Serial No. 226,622. (No model.)

*To all whom it may concern:*

Be it known that I, ANTONI TSCHUOR, a citizen of the United States, and a resident of Wapakoneta, in the county of Auglaize and State of Ohio, have invented certain new and useful Improvements in Combined Churns and Ice-Cream Freezers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 4:
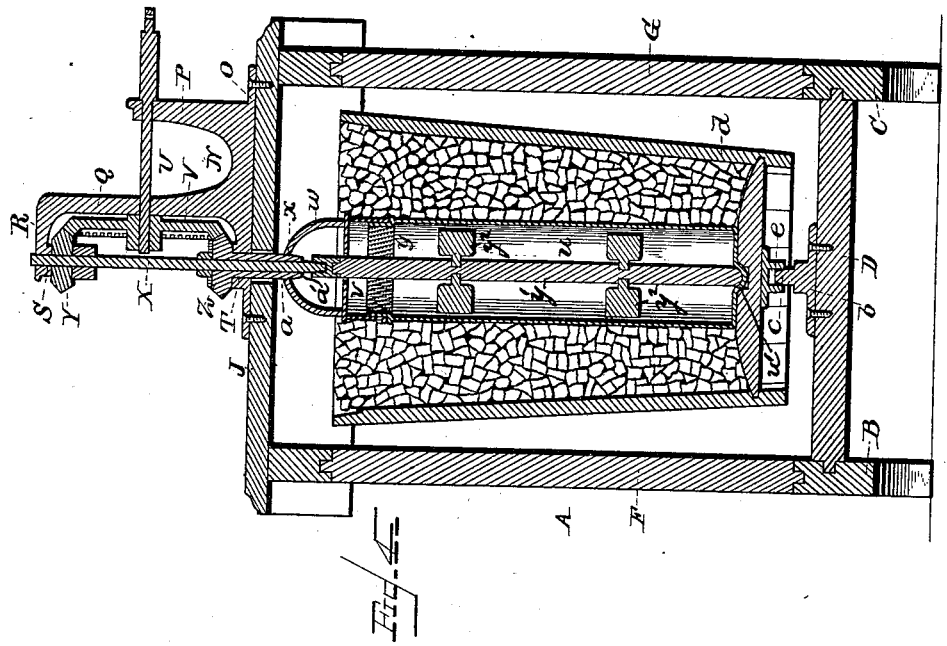
Figure 5:
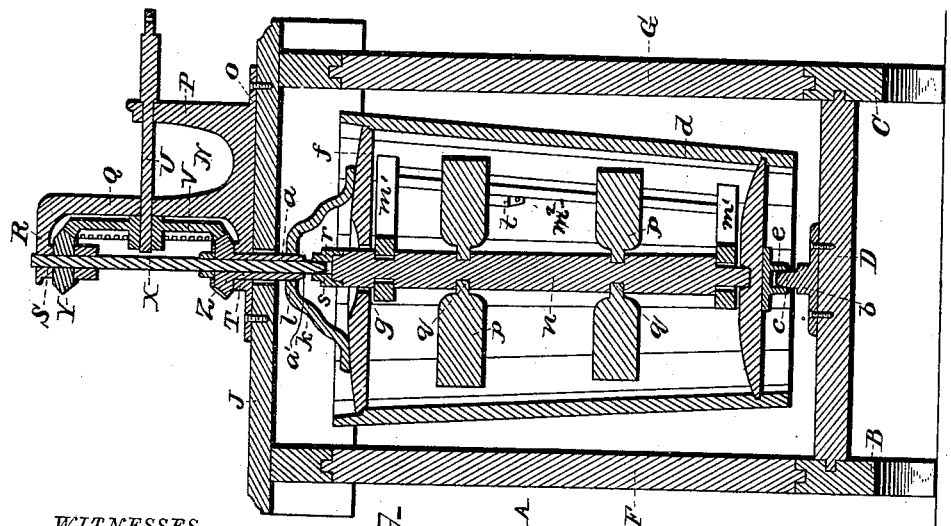
Figure 5:
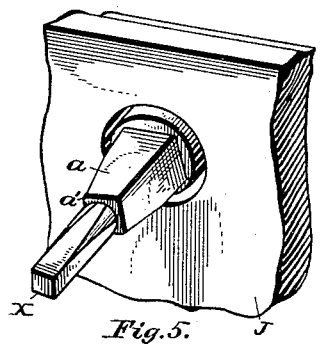
Figure 7:
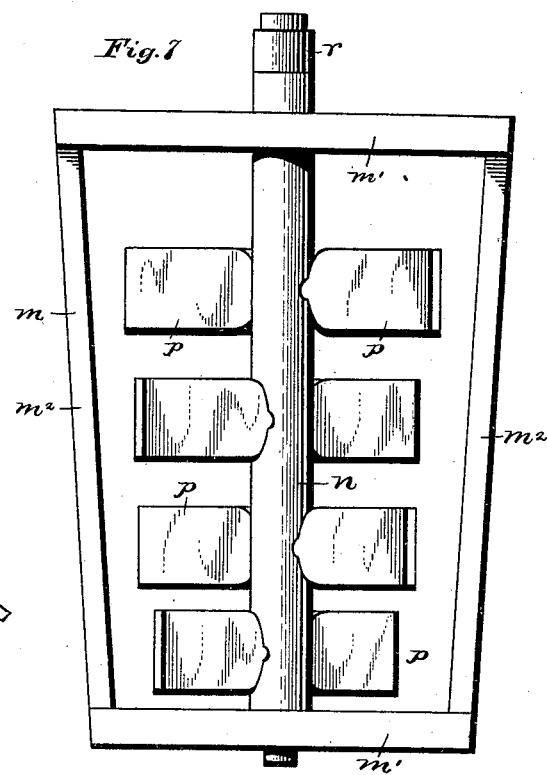
Figure 6:
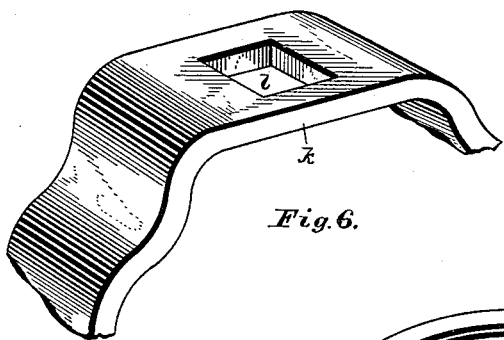
Figure 8:
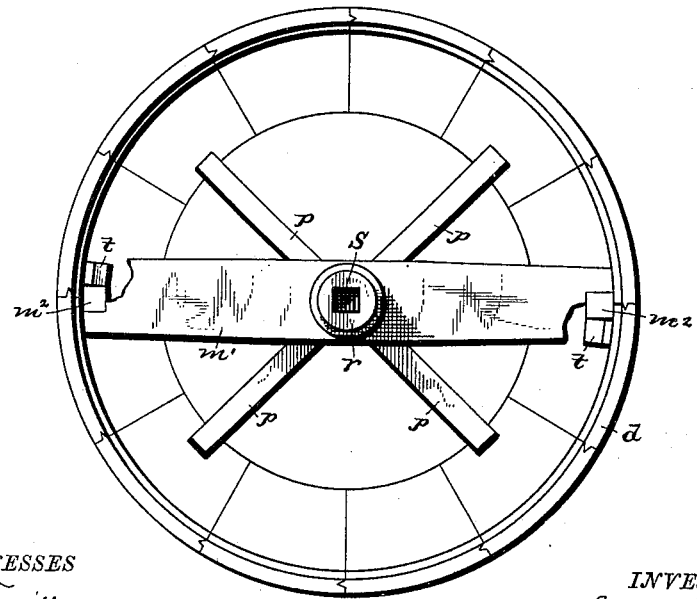

Figure 1 of the drawings is a front elevation of my improved churn. Fig. 2 is a vertical section on line $x\ x$, Fig. 1. Fig. 3 is a vertical section on line $y\ y$, Fig. 2. Fig. 4 is a vertical sectional view of the machine as an ice-cream freezer. Fig. 5 is a detail perspective view showing the lower ends of the vertical shaft X and hollow spindle $a$. Fig. 6 is a detail perspective view of the bridge $k$. Fig. 7 is a side elevation of the churn-dasher frame and shaft. Fig. 8 is a top view of the churn-body with lid removed.

The invention relates to improvements in combined churns and ice cream freezers; and it consists in the construction and the novel arrangement of parts, as hereinafter described, illustrated in the drawings, and pointed out in the claims hereto appended.

Referring to the drawings, A designates the frame of the device, having the feet B and C connected by the transverse rails D and E.

F, G, and H are uprights rising from the feet and supporting the top or table of the frame, which consists of the part I, secured to the top of the upright H, and the part J, constituting a leaf and hinged to the part I at K. The leaf has on its lower surface ribs having buttons attached to them, for the purpose of holding the leaf down by turning the buttons to engage proper recesses in the frame.

N is a casting bolted to the leaf through its base-plate O, near the front edge thereof, and provided with the vertical arms P and Q, the former shorter than the latter. The said arms are provided with bearings for the horizontal shaft U, having the crank-handle W on the outer end and the bevel gear-wheel V on the inner end.

X is a vertical shaft journaled in the bearing S in the horizontal extension R of the arm Q and in the hollow spindle $a$ in the bearing T of base-plate O of the casting N.

Y is a bevel-pinion secured on the shaft X and meshing with the wheel V at its top, and Z is a similar pinion turning loosely on said shaft and meshing with the wheel V at its lower edge. The wheel Z is kept from slipping upward on the shaft by a collar pinned to the shaft above it, and rests upon the base-plate O, having a hollow spindle, $a$, depending from it and passing through a suitable opening in the base-plate. The lower end, $a'$, of the said hollow spindle is squared, for a purpose hereinafter explained. The lower end of the shaft X, which projects a suitable distance below the end of the spindle, is also squared. The transverse rail D has secured centrally on its upper surface a block or casting, $b$, provided with the shouldered bearing-stud $c$ for the step $e$, secured centrally to the bottom of the churn-body $d$.

$n$ is the dasher-shaft stepped at its lower end in the center of the upper surface of the churn-bottom and passing through a central opening, $g$, in the top $f$ of the churn-body.

$r$ is a metal cap secured to the upper end of the dasher-rod and provided with a squared opening, $s$, for the squared end of the rod X, so that the dasher-rod is rotated by the pinion Y. The dasher-shaft has secured to it the similar blades $p$, the points $q$ of which are driven or inserted into suitable recesses of the shaft.

$k$ is a metal bridge secured to the top of the churn-lid and provided centrally with a squared opening, $l$, to receive the squared end of the spindle-sleeve $a$ of the pinion Z, which consequently rotates the churn-body, and in a different direction from the rotation of the dasher-shaft. The lid fits tightly enough to the body to cause the latter to rotate with it.

$m$ is the churn-dasher frame, consisting of the horizontal or upper and lower bars, $m'\ m'$, in which the dasher-shaft is journaled centrally, and the two longitudinal side bars, $m^2$, connecting the ends of the bars $m'$, which are enlarged at their central parts to afford room to make the bearings of the dasher-shaft.

The side bars, $m^2$, of the dasher-frame rest against the stop-blocks $t\ t$, secured within the churn at opposite points of the sides thereof, so that the said frame receives motion from and rotates with the churn-body and oppositely to the dasher-shaft.

The dasher-frame aids in keeping the dasher-shaft $n$ vertical and central in the churn-body.

The opposite rotations of the dasher and the churn-body strongly agitate the cream and cause the butter to come quickly.

To use the machine as an ice-cream freezer, the churn-dasher and lid are removed, after turning the leaf out of the way, and are replaced by the cream-vessel $u$, having the rounded or concave step $u'$ in the center of its bottom and a detachable cap or cover, $v$, provided with an arched bail, $w$, having a squared opening in its top to engage the squared end of the spindle $a$. The cream-vessel $u$ is shouldered and crimped, as at $y$, at its upper end, so that the cover will hold firm and cause the vessel to turn with it. A shaft, $y'$, having secured to it the blades $y^2$, and a metal cap, with a rectangular step to engage the lower end of the shaft X, has its rounded lower end placed in the step $u'$. The churn-body is then packed with ice and salt around the cream-vessel, and the operating mechanism secured to the leaf brought again into position. The shaft $y'$ is then turned in the opposite direction to the cream-vessel, and the cream consequently strongly agitated, so that it freezes quickly. The rounded step $u'$ of the cream-vessel is itself stepped in the central opening in the upper surface of the churn-bottom.

Having described my invention, I claim—

1. The combination of the supporting-frame provided with the top having a hinged leaf, and bottom engaging recesses in the frame, with the horizontal shaft journaled in the casting secured to said leaf, the bevel-pinion secured on the inner end of said shaft, the vertical shaft carrying the fixed bevel-pinion at its upper end and the loose bevel-pinion, and having its lower end squared, the hollow spindle depending from the loose pinion and having its end squared, the dasher-shaft having a rectangular opening in its upper-end cap to engage the lower end of the vertical shaft, the churn-lid fitting closely on the churn, and having a bridge secured to it provided with a rectangular opening to engage the squared end of the hollow spindle and the pivoted churn body, substantially as specified.

2. The combination of the churn-body, stepped upon the main frame at its lower end, the lid fitting closely thereon and provided with a bridge having a rectangular opening in its center, the dasher-shaft provided with the lateral blades stepped on the center of the churn-bottom, and having a cap on its upper end provided with the squared vertical opening, the vertical shaft having its lower end squared to engage in said opening, the sleeve surrounding said shaft and having its lower end squared to engage in the opening in the bridge on the lid, the dasher-frame $m$ and frame-stops $t$, and mechanism, substantially as described, whereby the vertical rod and surrounding sleeve are simultaneously rotated in opposite directions, substantially as specified.

In testimony whereof I affix my signature in presence of two witnesses.

ANTONI TSCHUOR.

Witnesses:
F. C. LAYTON,
R. B. ANDERSON.